(12) United States Patent
Kraft et al.

(10) Patent No.: US 6,530,715 B1
(45) Date of Patent: Mar. 11, 2003

(54) NONCONDUCTIVE EXTENSION FOR ELECTRIC MOTOR SHAFT

(75) Inventors: David P. Kraft, Long Valley, NJ (US); Richard J. Burke, Westwood, NJ (US)

(73) Assignee: Inventio AG, Hergiswil (CH)

( * ) Notice: Subject to any disclaimer, the term of this patent is extended or adjusted under 35 U.S.C. 154(b) by 72 days.

(21) Appl. No.: 09/709,007

(22) Filed: Nov. 8, 2000

(51) Int. Cl.[7] .................................................. F16B 7/00
(52) U.S. Cl. ....................... 403/296; 403/292; 403/192; 464/182; 33/1 PT
(58) Field of Search ..................... 731/514.39; 464/184, 464/182; 187/414, 394; 310/112, 113, 75 D; 250/231.13; 403/292, 296, 299, 335, 6, 187, 8, 192, 256, 7, 260; 411/149, 150, 155, 6, 531, 534, 546; 33/1 N, 1 PT

(56) References Cited

U.S. PATENT DOCUMENTS

| 864,779 | A | * | 9/1907 | Gamage | 403/241 |
|---|---|---|---|---|---|
| 2,676,279 | A | * | 4/1954 | Wilson | 310/75 D |
| 3,321,221 | A | * | 5/1967 | Harris et al. | 464/184 |
| 4,205,572 | A | * | 6/1980 | Weiner | 83/666 |
| 4,584,954 | A | * | 4/1986 | Soyama et al. | 112/275 |
| 5,085,536 | A | * | 2/1992 | Pelton | 403/343 |
| 5,709,516 | A | * | 1/1998 | Peterson et al. | 411/544 |
| 5,799,766 | A | * | 9/1998 | Link et al. | 192/70.16 |
| 5,981,940 | A | * | 11/1999 | Setbacken et al. | 250/231.13 |
| 6,311,402 | B1 | * | 11/2001 | Brandl et al. | 33/1 PT |

FOREIGN PATENT DOCUMENTS

DE          2 312 547         10/1974

* cited by examiner

Primary Examiner—Lynne H. Browne
Assistant Examiner—Michael P. Ferguson
(74) Attorney, Agent, or Firm—MacMillan, Sobanski & Todd, LLC

(57) ABSTRACT

An apparatus and method for adding a velocity transducer to an electric motor, such as an elevator drive motor, includes mounting a shaft extension on an end surface of a motor shaft by drilling and tapping a bore at the shaft center as parallel as possible. A fastener with a bevel washer between a pair of flat washers attaches the extension to the motor shaft. With the fastener assembly snug, the extension is trued radially with a dial indicator. The bevel washer functions as a spring lock and distributes any off center clamping force produced from non-concentric hole drilling. A shoulder on the extension abuts the motor shaft end surface to maintain parallelism of the longitudinal axes of the shaft extension and the motor shaft. The shaft extension can be formed of an electrically nonconductive material to isolate the transducer from the drive equipment.

9 Claims, 1 Drawing Sheet

NONCONDUCTIVE EXTENSION FOR ELECTRIC MOTOR SHAFT

BACKGROUND OF THE INVENTION

The present invention relates to a nonconductive extension for mounting an encoder on a shaft of an electric motor.

Current electronic controls for elevator system motors operate in a closed loop that requires a velocity feedback signal. When existing elevator equipment is modernized with these electronic controls, the previously installed electric traction motor must be retrofitted with a velocity feedback transducer. A rotating shaft of the traction motor must be fitted with a stub shaft that turns a transducer shaft through a coupling. The stub shaft is inserted into a hole drilled into the end of the motor shaft. If the stub shaft does not run true, it is tapped with a hammer to get it close. An adapter is mounted to the motor frame to support a transducer, such as a shaft encoder. A shaft of the encoder is attached to the stub shaft using a flex coupling. Installing the stub shaft on a rotational center of the output shaft is very difficult and time intensive. Also, any misalignment could cause a false signal feedback and premature coupling failure.

The German patent DE 2 312 547 shows a shaft mounted tachometer provided with a toothed ring coupled to the shaft by a spring and mounted to the shaft by a needle bearing. The rotating teeth cooperate with a stationary yoke and an induction coil to form a magnetic circuit generating a speed dependent signal.

SUMMARY OF THE INVENTION

The present invention concerns an apparatus and method for adding a velocity transducer to an electric motor such as an elevator drive motor. A shaft extension is mounted on an end surface of a motor shaft by drilling and tapping a bore at the shaft center as parallel as possible. A fastener with a bevel washer between a pair of flat washers attaches the extension to the motor shaft. With the fastener assembly snug, the extension is trued radially with a dial indicator. The bevel washer functions as a spring lock and distributes any off center clamping force produced from non-concentric hole drilling. A shoulder on the extension abuts the motor shaft end surface to maintain parallelism of the longitudinal axes of the shaft extension and the motor shaft. The shaft extension has a plastic construction to electrically isolate the transducer from the drive equipment as recommended by the drive equipment manufacturer.

The transducer is a hollow shaft encoder that tightens to the shaft extension by a split collar or a taper lock. An anti-torque device secures the encoder housing to the motor frame. The flat washers and the bevel washer lock the fastener in place and, if the threads in the bore in the motor shaft (which are drilled and tapped in the field) are not concentric with the motor shaft longitudinal axis, the load from the fastener head is evenly distributed to the shaft extension.

The apparatus according to the present invention will save approximately 50% installation and adjustment time, and eliminate callbacks due to broken or loose couplings.

It is an object of the present invention to reduce installation and adjustment labor for velocity transducers, and to eliminate service callbacks due to a coupling malfunction.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
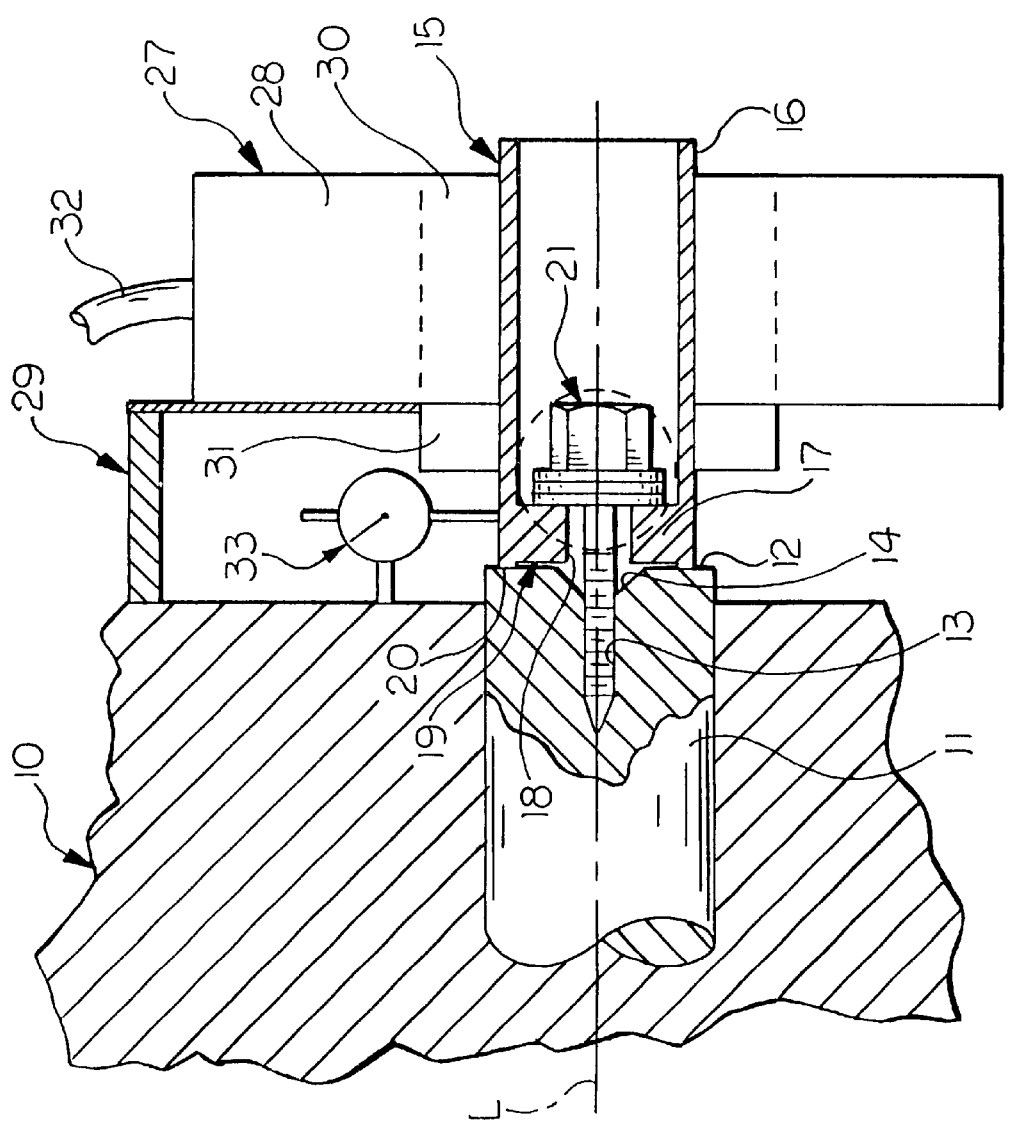
FIG. 1 is a fragmentary cross-sectional view of an electric motor with a shaft extension apparatus in accordance with the present invention.

There is shown in FIG. 1 an electric motor 10 of the type commonly used in elevator installations. The motor 10 includes a shaft 11 that is rotated to move an elevator car (not shown) in an elevator shaft. As improvements are made to elevator controls, it is desirable to modernize existing elevator systems by adding electronic controls with velocity feedback transducers. A convenient and reliable location for velocity information is the shaft 11. The shaft of the traction motor in an existing elevator installation can be modified to accept a velocity feedback transducer in accordance with the present invention.

The shaft 11 has a longitudinal axis L about which it rotates to move an associated elevator. An end surface 12 of the shaft 11 extends in a plane transverse to the longitudinal axis L. A threaded bore 13 is formed in the shaft 11 by drilling from the end surface 12 coaxially with the longitudinal axis L and forming internal threads. An open end of the bore 13 can be formed with a countersink 14.

The threaded bore 13 is utilized to attach a shaft extension 15 abutted to the end surface 12 of the shaft 11. The extension 15 is made from an electrically nonconductive material and has a generally tubular body 16. The extension 15 can be formed from a plastic material or any other suitable nonconductive material. At one end, the body 16 has a radially inwardly extending wall 17 with a central aperture 18 formed therein. A surface of the wall 17 facing the end surface 12 of the shaft 11 has a recess 19 formed therein resulting in an annular flange or shoulder 20 at the periphery of the body 16. The shoulder 20 abuts the end surface 12 when the shaft extension 15 is attached to the shaft 11.

Figure 2:
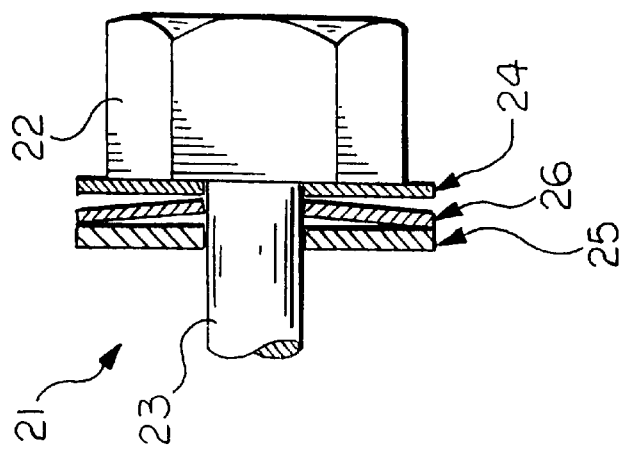
FIG. 2 is an enlarged view of a fastener portion of the shaft extension apparatus shown in FIG. 1.

A fastener 21 having a head 22 and a threaded shank 23 is provided to retain the shaft extension 15 to the shaft 11. The fastener 21 is inserted into the open end of the shaft extension 15 until the shank 23 extends through the aperture 18. The fastener 21 is then threaded into the bore 13 until the flange 20 seats on the end surface 12. As best shown in FIG. 2, a plurality of washers is positioned between the head 22 of the fastener 21 and the wall 17. A first flat washer 24 is positioned adjacent the head 22, a thicker second flat washer 25 is positioned adjacent the wall 17, and a bevel washer 26 is positioned between the two flat washers. The bevel washer 26 functions as a spring lock to distribute any off center clamping force produced by the bore 13 not being parallel to the longitudinal axis L.

A conventional hollow shaft encoder 27 is provided to generate an output signal representing the rotational velocity of the motor shaft 11. The encoder includes a stationary housing 28 that is attached to the frame of the motor 10 by an anti-torque device 29. A rotary portion 30 of the encoder 27 is attached to the shaft 11 by split collar or taper lock 31. The nonconductive shaft extension 15 electrically isolates the rotary portion 30 of the encoder 27 from the electric motor 10. The encoder 27 and the collar 31 are shown schematically since they are commercially available and their construction details are not a part of this invention. As the motor shaft 11 rotates, the rotary portion 30 is rotated relative to the encoder housing 28 to generate an electrical signal at a cable 32 extending from the housing. The output signal has a characteristic that represents the speed of rotation of the shaft 11 and, therefore, is proportional to the velocity of the elevator car being moved by the motor 10. For example, the output signal can be a sine wave or square wave pulses.

A suitable shaft encoder is the model HG 900 D.R hollow shaft incremental encoder available from Stegman Inc. of Dayton, Ohio. This encoder incorporates the housing 28, the anti-torque device 29, the rotary portion 30, the split collar 31, and the cable 32 in a single unit. However, any suitable hollow shaft encoder can be used and the present invention is not limited to the specific encoder described above.

In order to ensure an accurate output signal, the shaft extension 15 is installed in the following manner in accordance with the method of the present invention. As stated above, the present invention is typically installed in the field on the traction motor of an existing elevator installation. The bore 13 is drilled and tapped to be as concentric with the shaft 11 and parallel to the longitudinal axis L as possible. The extension 15 is installed on the shaft 11 with the fastener 21 and the washers 24, 25 and 26. This initial installation is snug, but not tight. Then a dial indicator 33 is temporarily attached to the motor frame 10 to engage the exterior surface of the shaft extension. The motor shaft 11 is rotated slowly and the shaft extension 15 can be lightly tapped with a hammer or the like to bring the extension to within 0.001" TIR. The fastener 21 is tightened and the runout is rechecked with the process repeated until the runout is within 0.001" TIR. The recess 19 provides a smaller contact area to make it easier to align the extension 15 with the shaft 11; i.e. maintain the longitudinal axis of the shaft extension perpendicular to the plane of the end surface 12. The hollow shaft encoder 27 is then attached to the shaft extension 15 by tightening the split collar or taper lock 31.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for attaching a velocity transducer to an electric motor shaft comprising:
   a shaft extension having a generally tubular body with a radially inwardly extending wall formed at one end thereof and an exterior transducer mounting surface receiving said velocity transducer, said wall having an aperture formed therein;
   a fastener having a head and a threaded shank extending therefrom, said head being positioned in said body with said shank extending through said aperture and out of said one end of said body; and
   a bevel washer mounted on said shank between said head and said wall whereby when said shank is threaded into a bore in a motor shaft to abut said shaft extension against an end surface of the motor shaft, said bevel washer compensates for misalignment between a longitudinal axis of the motor shaft and a longitudinal axis of the bore.

2. The apparatus according to claim 1 wherein said wall is recessed from said one end to form an axially extending annular shoulder for engaging the end surface of the motor shaft.

3. The apparatus according to claim 1 including a pair of flat washers mounted on said shank on opposite sides of said bevel washer.

4. The apparatus according to claim 1 wherein said body is formed of a nonconductive material.

5. The apparatus according to claim 4 wherein said nonconductive material is a plastic material.

6. An apparatus for attaching a velocity transducer to an electric motor shaft
   a motor shaft having a longitudinal threaded bore formed therein extending from an end surface of said motor shaft;
   a shaft extension having a generally tubular body with a radially inwardly extending wall formed at one end thereof an exterior transducer mounting surface, said wall having an aperture formed therein, and an axially extending annular shoulder abutting said motor shaft end surface;
   a fastener having a head and a threaded shank extending therefrom, said head being positioned in said body with said shank extending through said aperture and out of said one end of said body, said shank threadably engaging said bore; and
   a bevel washer mounted on said shank between said head and said wall whereby when said fastener is tightened to abut said shoulder against said motor shaft end surface, said bevel washer compensates for misalignment between a longitudinal axis of the motor shaft and a longitudinal axis of the bore.

7. The apparatus according to claim 6 including a pair of flat washers mounted on said shank on opposite sides of said bevel washer.

8. The apparatus according to claim 6 wherein said body is formed of a nonconductive material.

9. An apparatus for attaching a velocity transducer to an electric motor shaft comprising:
   a motor shaft having a longitudinal threaded bore formed therein extending from an end surface of said motor shaft;
   a shaft extension having a generally tubular body with a radially inwardly extending wall formed at one end thereof, an exterior transducer mounting surface, said wall having an aperture formed therein, and an axially extending annular shoulder abutting said motor shaft end surface;
   a fastener having a head and a threaded shank extending therefrom, said head being positioned in said body with said shank extending through said aperture and out of said one end of said body, said shank threadably engaging said bore;
   a pair of flat washers mounted on said shank between said head and said wall and
   a bevel washer mounted on said shank between said flat washers whereby when said fastener is tightened to abut said shoulder against said motor shaft end surface, said bevel washer compensates for misalignment between a longitudinal axis of the motor shaft and a longitudinal axis of the bore.

* * * * *